(12) United States Patent
Easwaran et al.

(10) Patent No.: US 9,207,977 B2
(45) Date of Patent: Dec. 8, 2015

(54) SYSTEMS AND METHODS FOR TASK GROUPING ON MULTI-PROCESSORS

(75) Inventors: Arvind Easwaran, Minneapolis, MN (US); Larry James Miller, Black Canyon City, AZ (US)

(73) Assignee: Honeywell International Inc., Morristown, NJ (US)

( * ) Notice: Subject to any disclaimer, the term of this patent is extended or adjusted under 35 U.S.C. 154(b) by 11 days.

(21) Appl. No.: 13/367,042

(22) Filed: Feb. 6, 2012

(65) Prior Publication Data

US 2013/0205301 A1    Aug. 8, 2013

(51) Int. Cl.
G06F 9/48    (2006.01)

(52) U.S. Cl.
CPC ............ G06F 9/4881 (2013.01); G06F 9/4887 (2013.01)

(58) Field of Classification Search
USPC .............. 704/1, 100, 102, 103, 104, 106, 107
See application file for complete search history.

(56) References Cited

U.S. PATENT DOCUMENTS

| | | | |
|---|---|---|---|
| 5,745,778 A | 4/1998 | Alfieri | |
| 6,438,553 B1 | 8/2002 | Yamada | |
| 6,560,628 B1 | 5/2003 | Murata | |
| 6,622,302 B1 | 9/2003 | Delaney et al. | |
| 6,678,712 B1 | 1/2004 | McLaren et al. | |
| 6,754,690 B2 | 6/2004 | Larson | |
| 6,964,048 B1 * | 11/2005 | Isham ............................ | 718/104 |
| 6,993,753 B2 | 1/2006 | Yamanaka et al. | |
| 7,107,590 B2 | 9/2006 | Bril et al. | |
| 7,140,022 B2 | 11/2006 | Binns | |
| 7,165,252 B1 | 1/2007 | Xu | |
| 7,302,685 B2 | 11/2007 | Binns | |
| 7,444,638 B1 | 10/2008 | Xu | |
| 7,472,389 B2 | 12/2008 | Smith | |

(Continued)

FOREIGN PATENT DOCUMENTS

| | | |
|---|---|---|
| WO | 02054238 | 7/2002 |
| WO | 2006004826 | 1/2006 |

(Continued)

OTHER PUBLICATIONS

U.S. Patent and Trademark Office, "Notice of Allowance", "U.S. Appl. No. 13/195,529", Jun. 26, 2013, pp. 1-26.

(Continued)

*Primary Examiner* — Qing Wu
*Assistant Examiner* — Wynuel Aquino
(74) *Attorney, Agent, or Firm* — Fogg & Powers LLC

(57) ABSTRACT

Embodiments of the present invention provide improved systems and methods for grouping instruction entities. In one embodiment, a system comprises a processing cluster to execute software, the processing cluster comprising a plurality of processing units, wherein the processing cluster is configured to execute the software as a plurality of instruction entities. The processing cluster is further configured to execute the plurality of instruction entities in a plurality of execution groups, each execution group comprising one or more instruction entities, wherein the processing cluster executes a group of instruction entities in the one or more instruction entities in an execution group concurrently. Further, the execution groups are configured so that a plurality of schedule-before relationships are established, each schedule-before relationship being established among a respective set of instruction entities by executing the plurality of instruction entities in the plurality of execution groups.

20 Claims, 6 Drawing Sheets

(56) References Cited

U.S. PATENT DOCUMENTS

| | | | |
|---|---|---|---|
| 7,681,014 B2 | 3/2010 | Jensen et al. | |
| 7,788,673 B2 | 8/2010 | Bibby | |
| 7,827,551 B2 | 11/2010 | Kulbak | |
| 7,840,966 B2 | 11/2010 | Dodge | |
| 7,844,952 B2 | 11/2010 | Barsness et al. | |
| 7,873,507 B2 | 1/2011 | Tatsuoka et al. | |
| 7,908,604 B2 | 3/2011 | Takayama | |
| 7,913,256 B2 * | 3/2011 | Torii et al. | 718/102 |
| 8,036,688 B2 | 10/2011 | Oh | |
| 8,074,222 B2 | 12/2011 | Hirai | |
| 8,209,701 B1 * | 6/2012 | Roytman et al. | 718/106 |
| 8,527,971 B2 * | 9/2013 | Helovuo | 717/149 |
| 8,607,236 B2 | 12/2013 | Kawano et al. | |
| 8,893,144 B2 | 11/2014 | Haham et al. | |
| 2001/0023434 A1 | 9/2001 | Viollet et al. | |
| 2001/0054055 A1 * | 12/2001 | Bollella | 709/102 |
| 2002/0120661 A1 | 8/2002 | Binns | |
| 2002/0124043 A1 | 9/2002 | Otero Perez et al. | |
| 2002/0198925 A1 | 12/2002 | Smith et al. | |
| 2003/0069917 A1 | 4/2003 | Miller | |
| 2003/0088606 A1 | 5/2003 | Miller | |
| 2003/0101084 A1 | 5/2003 | Otero Perez | |
| 2003/0154234 A1 | 8/2003 | Larson | |
| 2005/0028160 A1 | 2/2005 | Cofer et al. | |
| 2005/0066330 A1 * | 3/2005 | Kanai et al. | 718/102 |
| 2006/0085582 A1 | 4/2006 | Shikano et al. | |
| 2006/0107264 A1 | 5/2006 | Schmidt et al. | |
| 2006/0136915 A1 | 6/2006 | Aingaran | |
| 2006/0206887 A1 | 9/2006 | Dodge et al. | |
| 2006/0218558 A1 | 9/2006 | Torii et al. | |
| 2007/0204268 A1 * | 8/2007 | Drepper | 718/102 |
| 2007/0294384 A1 | 12/2007 | Nakajima et al. | |
| 2008/0028415 A1 | 1/2008 | Binns et al. | |
| 2008/0317026 A1 | 12/2008 | Vogl et al. | |
| 2009/0031317 A1 | 1/2009 | Gopalan et al. | |
| 2009/0113426 A1 | 4/2009 | Mizuno | |
| 2009/0158297 A1 | 6/2009 | Lee | |
| 2009/0217280 A1 | 8/2009 | Miller | |
| 2009/0307700 A1 | 12/2009 | Cazorla Almeida | |
| 2010/0088706 A1 * | 4/2010 | Dong et al. | 718/103 |
| 2010/0131955 A1 | 5/2010 | Brent et al. | |
| 2010/0199280 A1 | 8/2010 | Vestal | |
| 2010/0268912 A1 | 10/2010 | Conte et al. | |
| 2010/0306750 A1 | 12/2010 | Helovuo | |
| 2010/0333098 A1 * | 12/2010 | Jordan et al. | 718/103 |
| 2011/0067029 A1 | 3/2011 | Wolfe et al. | |
| 2011/0252426 A1 | 10/2011 | Antani et al. | |
| 2011/0314476 A1 | 12/2011 | Choi | |
| 2012/0284732 A1 | 11/2012 | Griglock et al. | |
| 2013/0036421 A1 | 2/2013 | Miller et al. | |
| 2013/0036423 A1 | 2/2013 | McCready et al. | |
| 2014/0122848 A1 | 5/2014 | Easwaran et al. | |

FOREIGN PATENT DOCUMENTS

| | | |
|---|---|---|
| WO | 2009007169 | 1/2009 |
| WO | 2010001353 | 1/2010 |
| WO | 2012005637 | 1/2012 |

OTHER PUBLICATIONS

U.S. Patent and Trademark Office, "Office Action", "U.S Appl. No. 13/195,503", Jun. 7, 2013, pp. 1-30.

Easwaran et al., "Systems and Methods for Instruction Entity Allocation and Scheduling on Multi-Processors", "U.S. Appl. No. 13/665,294", filed Oct. 31, 2012, pp. 1-66.

Bini, "A Hyperbolic Bound for the Rate Monotonic Algorithm", "Proceedings of the 13th Euromicro Conference on Real-Time Systems", Jun. 2001, pp. 1-14, Published in: Delft, The Netherlands.

Bini, "Schedulability Analysis of Periodic Fixed Priority Systems", "IEEE Transactions on Computers ", Nov. 2004, pp. 1-12, vol. 53, No. 11.

Binns, "A Robust High-Performance Time Partitioning Algorithm: The Digital Engine Operating System (DEOS) Approach", Oct. 18, 2001, pp. 1-12, Publisher: IEEE.

Kato, "A Fixed-Priority Scheduling Algorithm for Multiprocessor Real-Time Systems", "Parallel and Distributed Computing", Jan. 2010, pp. 143-158.

Lehoczky, "The Rate Monotonic Scheduling Algorithm: Exact Characterization and Average Case Behavior", Dec. 7, 1989, pp. 166-171, Publisher: IEEE.

Liu, "Scheduling Algorithms for Multiprogramming in a Hard-Real-Time Environment", "Journal of the Association for Computing Machinery", Jan. 1973, pp. 46-61, vol. 20, No. 1, Publishd in: US.

"Why multi core processors?", "accessed Feb. 26, 2012", Jun. 13, 2010, pp. 1-3, Publisher: http://superuser.com/questions/152011/why-multi-core-processors.

Paolieri, "Hardware Support for WCET Analysis of Hard Real-Time Multicore Systems", "ISCA '09", Jun. 20-Jun. 24, 2009, pp. 1-12, Publisher: ACM.

Ramya, "Window Constrained Scheduling of Processes in Real Time CPU Using Multi Objective Genetic Algorithm", "International Journal of Computer Applications (0975-8887)", Feb. 2010, pp. 86-90, vol. 1, No. 21.

Srinivasan, "The Case for Fair Multiprocessor Scheduling", Nov. 2002, pp. 1-18, Publisher: Department of Computer Science University of North Carolina.

McCready et al., "Systems and Methods for Bounding Processing Times on Multiple Processing Units", "U.S. Appl. No. 13/195,503, filed Aug. 1, 2011", p. 23.

Miller et al., "Constrained Rate Monotonic Analysis and Scheduling", "U.S. Appl. No. 13/195,529, filed Aug. 1, 2011", p. 56.

Yamada, "Proposal and Evaluation of APIS for Utilizing Inter-Core Time Aggregation Scheduler", "Presented at the 15th Workshop on Job Scheduling Strategies for Parallel Processing (http://www.cs.huji.ac.il/~feit/parsched/jsspp10/p11-yamada.pdf)", Apr. 23, 2010, pp. 1-18.

Yamada, "Proposal and Evaluation of APIS for Utilizing Inter-Core Time Aggregation Scheduler", Oct. 9, 2010, pp. 191-207, vol. 6253, Publisher: Springer-Verlag Berlin Heidelberg.

Yan, "WCET Analysis for Multi-Core Processors With Shared L2 Instruction Caches", "IEEE Real-Time and Embedded Technology and Applications Symposium", Apr. 22, 2008, pp. 80-89, Publisher: IEEE.

European Patent Office, "Office Action", "from Foreign Counterpart of U.S. Appl. No. 13/195,503", Feb. 5, 2013, pp. 1-6, Published in: EP.

European Patent Office, "European Search Report", "from Foreign Counterpart of U.S. Appl. No. 13/195,503", Jan. 24, 2013, pp. 1-4, Published in: EP.

European Patent Office, "Office Action", "from Foreign Counterpart of U.S. Appl. No. 13/195,529", Feb. 13, 2013, pp. 1-7, Published in: EP.

European Patent Office, "European Search Report", "from Foreign Counterpart of U.S. Appl. No. 13/195,529", Feb. 1, 2013, pp. 1-3, Published in: EP.

Cronk, "Improve CPU Utilization with DEOS Slack RTOS Scheduling", Sep. 28, 2009, pp. 1-6.

Feitelson et al., "Distributed Hierarchical Control for Parallel Processing", May 1990, pp. 65-78.

Macariu, "A Model Checking Approach for Multi-core Time Partitions Design", "2010 10th IEEE International Conference on Computer and Information Technology", Jun. 2010, pp. 1910-1917.

Vanderleest, "ARINC 653 Hypervisor", "Digital Avionics Systems Conference 2010", Oct. 2010, pp. 1-20.

U.S. Patent and Trademark Office, "Office Action", "U.S. Appl. No. 13/195,529", Apr. 24, 2013, pp. 1-29.

U.S. Patent and Trademark Office, "Advisory Action", "from U.S. Appl. No. 13/195,503", Mar. 27, 2014, pp. 1-3, Published in: US.

U.S. Patent and Trademark Office, "Final Office Action", "from U.S. Appl. No. 13/195,503", Jan. 7, 2014, pp. 1-22, Published in: US.

European Patent Office, "European Search Report from EP Application No. 131523961 mailed Apr. 25, 2014", "from Foriegn Counterpart of U.S. Appl. No. 13/367,042", Apr. 25, 2014, pp. 1-3, Published in: EP.

(56) References Cited

OTHER PUBLICATIONS

European Patent Office, "Office Action from EP Application No. 13152396.1 mailed May 20, 2014", "from Foreign Counterpart of U.S. Appl. No. 13/367,042", May 20, 2014, pp. 1-8, Published in: EP.

U.S. Patent and Trademark Office, "Notice of Allowance", "from U.S. Appl. No. 13/195,503", May 9, 2014, pp. 1-12, Published in: US.

European Patent Office, "European Offie Action from EP Application No. 12177868.2 mailed Jul. 21, 2014", "from Foreign Counterpart of U.S. Appl. No. 13/195,503", Jul. 21, 2014, pp. 1-5.

U.S. Patent and Trademark Office, "Notice of Allowance and Fee(s) Due", "U.S. Appl. No. 13/195,503", Aug. 18, 2014, pp. 1-12, Published in: US.

European Patent Office, "European Office Action From EP Application No. 12177911.0", "from Euorpean Counterpart of U.S. Appl. No. 13/195,529", Jul. 21, 2014, pp. 1-5.

European Patent Office, "Office Action from EP Application No. 13187196.4 mailed Jul. 3, 2014", "from Foreign Counterpart of U.S. Appl. No. 13/665,294", Jul. 3, 2014, pp. 1-14, Published in: EP.

European Patent Office, "European Search Report from EP Application No. 13187196.4 mailed Jun. 13, 2014", "from Foreign Counterpart of U.S. Appl. No. 13/665,294", Jun. 13, 2014, pp. 1-4, Published in: EP.

Kopetz, "Real-Time Systems: Design Principles for Distributed Embedded Applications Second Edition", 2011, pp. 1-387, Publisher: Springer Science + Business Media, LLC.

Nemati et al., "Multiprocessor Synchronization and Hierarchical Scheduling", "International Conference on Parallel Processing Workshops", Sep. 22, 2009, pp. 58-64, Published in: SE.

Sprunt et al, "Aperiodic Task Scheduling for Hard-Real-Time Systems", "The Journal of Real-Time Systems", Jun. 1989, pp. 27-60.

Thomadakis, "Efficient Scheduling of Firm Aperiodic Tasks in Fixed-Priority, Hard Real-Time Systems", Mar. 2, 2011, pp. 1-28.

U.S. Patent and Trademark Office, "Office Action", "U.S. Appl. No. 13/665,294", Jan. 15, 2015, pp. 1-61.

European Patent Office, "European Office Action for Application Serial No. 1277868.2", "from Foreign Counterpart to U.S. Pat. No. 8,875,146", May 11, 2015, pp. 1-5, Published in: EP.

European Patent Office, "Communication pursuant to Article 94(3) from European Patent Application No. 12177911.0", "from Foreign Counterpart to U.S. Pat. No. 8,621,473", Apr. 14, 2015, pp. 1-5, Published in: EP.

Sibsankar et al., "Real-Time and Embedded Operating Systems", "subsection title 'Rate Monotonic Scheduling Algorithm'", Nov. 25, 2009, Page(s) section 15.6.1, Publisher: Pearson India.

European Patent Office, "Office Action from EP Application No. 13187196.4 mailed Jul. 14, 2015", "from Foreign Counterpart of U.S. Appl. No. 13/665,294", Jul. 14, 2015, pp. 1-17, Published in: EP.

U.S. Patent and Trademark Office, "Final Office Action", "U.S. Appl. No. 13/665,294", Jul. 14, 2015, pp. 1-32.

\* cited by examiner

SYSTEMS AND METHODS FOR TASK GROUPING ON MULTI-PROCESSORS

CROSS REFERENCE TO RELATED APPLICATIONS

This application is related to co-pending U.S. patent application Ser. No. 13/195,503 entitled "SYSTEMS AND METHODS FOR BOUNDING PROCESSING TIMES ON MULTIPLE PROCESSING UNITS" filed on Aug. 1, 2011, which is hereby incorporated herein in its entirety by reference.

This application is related to co-pending U.S. patent application Ser. No. 13/195,529 entitled "CONSTRAINED RATE MONOTONIC ANALYSIS AND SCHEDULING" filed on Aug. 1, 2011, which is hereby incorporated herein in its entirety by reference.

BACKGROUND

Multi-core processors are able to process different computational tasks simultaneously. As such, multi-core processors can execute more instructions in a given period of time as compared to single core processors. During the execution of instructions that belong to different computational tasks, the different cores on multi-core processors share resources such as on-chip communication buses, memory controllers, caches, I/O devices, and the like. At times, tasks executing on different cores interfere with one another due to these shared resources. When a multi-core processor is used in a safety-critical real time system, the worst case processing time of the executing tasks must be known for the different tasks that execute on each processor. However, it is difficult to measure and bound the degree of cross-core interference between executing tasks due to shared resources. The challenge of measuring and bounding the effects of the resource conflicts inhibits safety-critical real time systems from taking advantage of the full performance benefits presented by multi-core processors.

Further, in safety-critical real time systems, executing tasks are subject to certain scheduling requirements. Scheduling requirements entail rules that must be satisfied for the proper execution of multiple tasks. An example of scheduling requirements includes system specific scheduling restrictions (such as those imposed due to design assurance levels (DAL) for aircraft software) and "schedule before" relationships (described below).

SUMMARY

In one embodiment, a system comprises a processing cluster to execute software, the processing cluster comprising a plurality of processing units, wherein the processing cluster is configured to execute the software as a plurality of instruction entities. The processing cluster is further configured to execute the plurality of instruction entities in a plurality of execution groups, each execution group comprising one or more instruction entities, wherein the processing cluster executes a group of instruction entities in the one or more instruction entities in an execution group concurrently. Further, the execution groups are configured so that a plurality of schedule-before relationships are established, each schedule-before relationship being established among a respective set of instruction entities by executing the plurality of instruction entities in the plurality of execution groups.

DRAWINGS

Reference characters denote like elements throughout figures and text.

DETAILED DESCRIPTION

Figure 1:
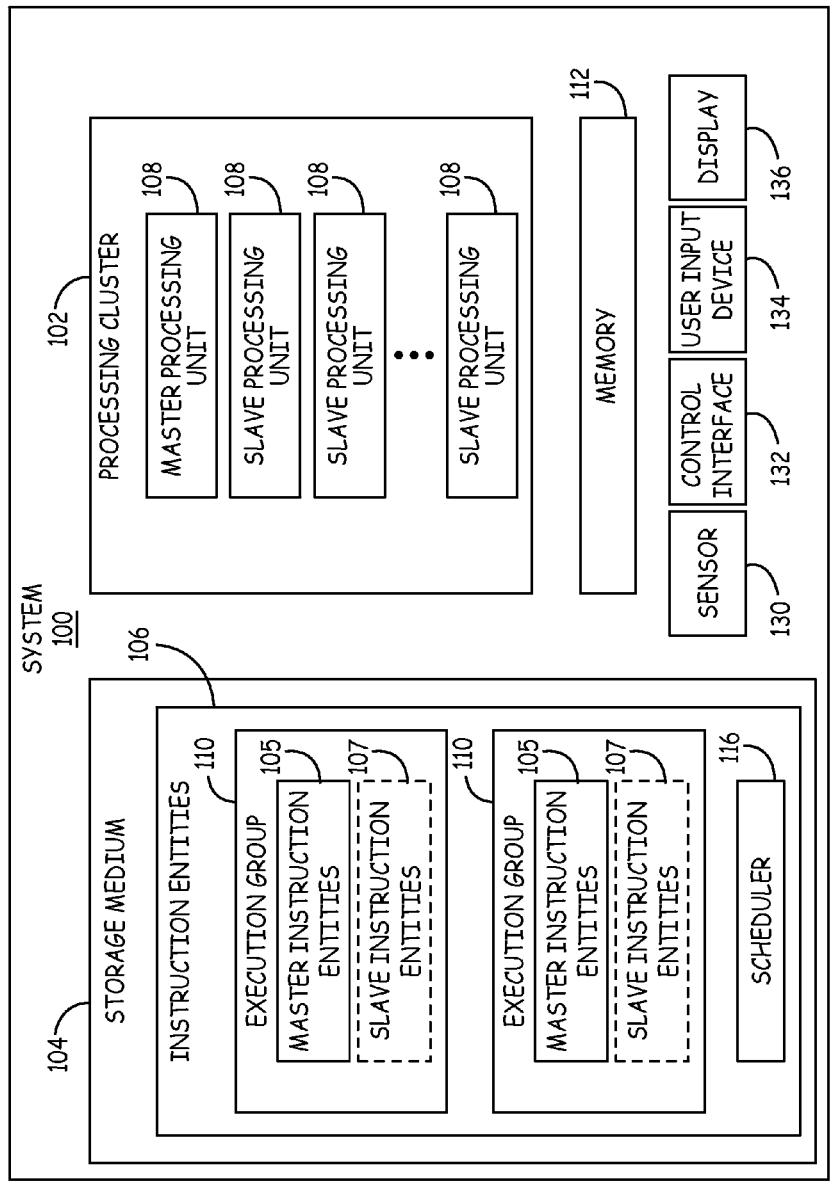
FIG. 1 is a block diagram of one high-level embodiment of a system for enforcing scheduling requirements.

FIG. 1 is a block diagram of one exemplary embodiment of a system 100 for enforcing execution requirements and constraints. System 100 is generally implemented in embedded systems, standard computing systems, and other implementations. In at least one embodiment, system 100 uses an operating system (such as a real time operating system), where the operating system has scheduling requirements. System 100 includes at least one processing cluster 102. Processing cluster 102 includes multiple processing units 108, where a processing unit 108 is a computational device capable of accepting data and performing mathematical and logical operations as instructed by program instructions. Exemplary embodiments of a processing cluster 102 include central processing units (CPUs) in a multi-CPU system, cores in a multi-core CPU (where "cores" are independent processors fabricated on the same processing chip), or virtual processors within a multithreaded processing unit. Alternatively, the multiple processing units in system 100 can be divided into multiple processing clusters 102. (For example, a multi-core CPU with four cores can contain two separate processing clusters 102, each processing cluster 102 having two processing units 108.)

In the exemplary embodiment shown in FIG. 1, program instructions are stored (or otherwise embodied) on or in an appropriate non-transitory storage medium or media 104 (such as flash or other non-volatile memory, magnetic disc drives, and/or optical disc drives). At least a portion of the program instructions are read from the storage medium 104 by processing units 108 in processing cluster 102 for execution thereby. These program instructions are also referred to here as "software". The storage medium 104 on or in which the program instructions are embodied is also referred to here as a "program product." Although the storage media 104 is shown in FIG. 1 as being included in, and local to, the respective processing cluster 102, it is to be understood that remote storage media (for example, storage media that are accessible over a network) and/or removable media can also be used. Computing system 100 also includes memory 112 for storing the program instructions (and any related data) during execution by processing units 108 in processing cluster 102. Memory 112 comprises, in one implementation, any suitable form of random access memory (RAM) now known or later developed, such as dynamic random access memory (DRAM). In other embodiments, other types of memory are used. Further, in some exemplary implementations, each processing unit in processing cluster 102 has a separate memory 112 dedicated to storing the program instructions during execution on the associated processing unit.

In a further exemplary embodiment shown in FIG. 1, system 100 includes other devices that facilitate the transmission and reception of information with an external system. For example, as shown in FIG. 1, system 100 includes a sensor 130, which senses external parameters (otherwise produces a signal or information indicative of some physical phenomenon) and transmits them to the processing cluster 102 for use by the processing cluster (more specifically, the program instructions executing thereon). Further, system 100 includes a control interface 132. In this embodiment, when processing cluster 102 executes program instructions, processing cluster will transmit electrical signals to control interface 132 to control an external system connected to system 100. Also, in at least one exemplary embodiment, system 100 interacts with a user. To facilitate interaction with a user, system 100 includes at least one user input device 134 and a display 136. Each user input device 134 receives input from a user and transmits the input to processing cluster 102 for use by the processing cluster 102 (more specifically, the program instructions executing thereon). Also, in this embodiment, processing cluster 102 outputs information for viewing by a user to display 136, which displays the information for the user.

In the exemplary embodiment shown in FIG. 1, storage medium 104 stores the program instructions as instruction entities 106. As used herein, the term "instruction entity" 106 refers to an entity that is or identifies a group of program instructions for one or more tasks that are to be executed by processing units 108. For example, an instruction entity 106 can be implemented as an actual or direct grouping of program instructions or indirectly using one or more references to the program instructions included in the associated grouping.

In the exemplary embodiment shown in FIG. 1, the software executed by the system 100 comprises a scheduler 116. That is, scheduler 116 is implemented as software and includes appropriate program instructions that, when executed on processing cluster 102, schedule the execution of instruction entities 106 by the processing units 108 in the processing cluster 102. In one implementation of such an embodiment, scheduler 116 is implemented as part of an operating system. In another implementation, the scheduler 116 is implemented, at least in part, outside of the core operating system (for example, as a part of an application/executive (APEX) interface).

Also, in one implementation of such an embodiment, the scheduler 116 is configured to dynamically schedule the execution of instruction entities 106. In another implementation, the scheduler 116 is configured to schedule the execution of instruction entities 106 according to a static schedule or definition that delineates execution time and execution periods for the instruction entities 106.

Moreover, in one implementation of such an embodiment, the scheduler 116 is implemented using a plurality of schedulers 116, where each scheduler 116 is dedicated to scheduling for a single processing unit 108 or a subset of the processing units 108 in the processing cluster 102.

The scheduler 116 used in system 100 determines which processing unit 108 in processing cluster 102 will execute a particular instruction entity 106. Also, the scheduler 116 determines, at any given point in time, which instruction entities 106 are to be executed on each processing unit 108. Scheduler 116 uses a scheduling algorithm or other scheduling policy that provides rules and methods for determining how to schedule the execution of instruction entities 106. Scheduler 116 uses scheduling algorithms such as rate monotonic, priority preemptive, round robin, and the like. In one implementation of such an embodiment, the scheduler 116 uses a single scheduling algorithm for scheduling the execution of the instruction entities 106 on the various processing units 108 in the processing cluster 102. In another implementation, scheduler 116 uses multiple scheduling algorithms for scheduling the execution of the instruction entities 106 on the different processing units 108 within processing cluster 102. For example, in such alternative implementations, scheduler 116 uses a first scheduling algorithm to schedule some of the instruction entities 106 for execution on a first processing unit 108 and a second scheduling algorithm to schedule execution of some of the instruction entities 106 on a different processing unit 108 within processing cluster 102.

In at least one exemplary embodiment, scheduler 116 schedules instruction entities 106 in a time partitioned operating system. When scheduler 116 schedules instruction entities 106 in a time partitioned operating system, scheduler 116 allots a processing budget to the instruction entities 106 that execute on processing cluster 102. The allotted processing budget defines a period of time during which an instruction entity 106 is allowed to execute on a processing unit 108. Further, scheduler 116 allots processing budgets to instruction entities 106 that allow instruction entities 106 to complete execution in either continuous or non-continuous time intervals. For example, when an instruction entity 106 completes execution in a continuous time interval, the scheduler 116 allots a processing budget for the execution of the instruction entity 106 that is sufficiently long to allow the execution of instruction entity 106 to complete execution without interruption. Alternatively, when instruction entity 106 completes execution in non-continuous time intervals, the scheduler 116 allots multiple non-continuous processing budgets for the execution of instruction entity 106 where the multiple non-continuous processing budgets allow sufficient time for the completion of the execution of the instruction entity 106.

In the present example shown in FIG. 1, the instruction entities 106 are organized into different execution groups 110. As the term is used herein, an "execution group" is a sub-set of instruction entities 106 that are able to concurrently execute on processing cluster 102. In certain embodiments, to create an execution group 110, scheduler 116 assigns a sub-set of instruction entities 106 to an execution group 110. The scheduler 116 dynamically assigns instruction entities 106 into different execution groups 110 or follows a static definition that defines the instruction entities 106 within particular execution groups 110. In an alternative implementation, the assignment of instruction entities 106 to different execution groups 110 is performed by an external tool dedicated to the creation of execution groups 110, where the tool operates independently of the system 100. As explained in greater detail below, organizing the instruction entities 106 into execution groups allows a scheduler to satisfy schedule-before relationships between different instruction entities 106 that execute on multiple processing units 108 while also honoring scheduling requirements.

In safety critical systems, the worst case execution time for the execution of instruction entities 106 must be defined such that the worst case execution time is bounded. The worst case execution time of parallel executing instruction entities 106 is affected by factors such as competition for hardware resources between the executing instruction entities 106 and execution overhead involved with scheduling multiple instruction entities 106. An effect of organizing instruction entities 106 into execution groups 110 is that execution overhead and interaction between concurrently executing instruction entities 106 are constrained within execution groups 110. That is, an instruction entity 106 suffers interference and execution overhead only from other instruction entities 106 in the same execution group 110. As a result, the difficulties associated with interference and overhead is reduced.

In the exemplary embodiment shown in FIG. 1, scheduler 116 designates one or more of the instruction entities 106 within each execution group 110 as "master" instruction entities 105 with the remaining instruction entities within each execution group 110 being designated as "slave" instruction entities 107. Further, in the processing cluster 102, the scheduler 116 designates one processing unit 108 in the processing cluster 102 as a "master" processing unit 108 while the other processing units 108 in the processing cluster 102 are designated as "slave" processing units 108. Scheduler 116 schedules the master instruction entities 105 for execution on the master processing unit 108 and the slave instruction entities 107 for execution on the slave processing units 108. In one implementation, the scheduler 116 selects different processing units 108 as the master processing unit 108 for different execution groups 110.

For each execution group 110, the scheduler 116 schedules the instruction entities 106 for execution on the processing cluster 102 so that the instruction entities 106 for only a single execution group 110 execute on the processing units 108 in the processing group 102 at any given point in time. As used herein, the execution group 110 that is scheduled for execution on the processing cluster 102 at any given point in time is also referred to as the "current" execution group 110. To schedule the current execution group 110, the scheduler 116 directs master instruction entities 105 in the current execution group 110 to execute on the designated master processing unit 108. While the master instruction entities 105 executes, scheduler 116 schedules any slave instruction entities 107 within the current execution group to execute on a designated slave processing unit 108. When the master instruction entities 105 finish executing, scheduler 116 stops the execution of all the instruction entities 106 within the current execution group 110. By configuring the scheduler 116 to ensure that only instruction entities 106 for a designated current execution group 110 are executing at any given point in time, the correct scheduling of all of the instruction entities 106 in accordance with various scheduling requirements can be simplified and the cross-core interference bounds can be simplified and more easily verified.

Typically, the scheduling of instruction entities 106 by scheduler 116 is constrained by scheduling requirements. One example of a scheduling requirement is a schedule-before relationship. For some applications, the execution of two or more instruction entities 106 is subject to one or more schedule-before relationships. A schedule-before relationship exists when the correct execution of at least one instruction entity 106 depends on the successful completion of the execution of at least one other instruction entity 106. In one example, where at least one instruction entity 106 has a schedule-before relationship with one or more other instruction entities 106, the execution of the at least one instruction entity 106 produces data that is required for the proper execution of the one or more other instruction entities 106. Thus, the at least one instruction entity 106 must complete execution so that the one or more other instruction entities 106 can begin executing. In one exemplary embodiment, the scheduler 116 assigns instruction entities 106 in a schedule-before relationship to the same execution group 110. When the instruction entities 106 are in the same execution group, the scheduler 116 can control when both instruction entities 106 in the schedule-before relationship execute in relation to one another. For example, where a first instruction entity 106 has a schedule-before relationship with a second instruction entity 106, within the processing budget allotted to the master instruction entities 105 in execution group 110, the scheduler 116 will schedule the first instruction entity 106 to execute. When the first instruction entity 106 completes execution, the scheduler 116 will schedule the second instruction entity 106 to execute. These first and second instruction entities 106 can both be either master instruction entities 105 or slave instruction entities 107. In an alternative exemplary embodiment, other scheduling requirements prevent instruction entities 106 in a schedule-before relationship from being in the same execution group 110. To enforce a schedule-before relationship between a first instruction entity 106 in a first execution group 110 and a second instruction entity 106 in a second execution group 110, the scheduler 116 schedules the execution of the master instruction entities 105 in the first execution group 110 before the execution of the master instruction entities 105 in the second execution group 110.

In some applications, the scheduling of instruction entities 106 by scheduler 116 is constrained by a scheduling restriction that prevents instruction entities 106 from being within the same execution group 110. For example, in certain safety critical applications (like aircraft control systems), a scheduling restriction prevents instruction entities 106 that have a different design assurance level from being in the same execution group 110. As used herein, the phrase "design assurance levels" refers to different levels of design, development, and testing rigor that are applied to software. In certain safety critical systems, like systems that control airplane operation, the varying levels of rigor are used to predict the quality and reliability of the software. More specifically, the design assurance level indicates a system's ability to accommodate potential equipment failures and the potential effects that the software failure can have on safety. A given design assurance level thus guarantees that the equipment was designed according to particular design rules and that the equipment design took account of failure modes for the components of the equipment that are operated by the software, where the failure modes result from software failures. For example, design assurance levels can be represented by levels A, B, C, D, and E. In some implementations, the design level A reflects that a software failure can have a catastrophic effect on flight safety, while the design level E reflects that a software failure will have no effect on flight safety, with the other intermediary design levels B through D reflecting successively lesser effects on flight safety. In applications where the reliability and safety of the software is a concern, the scheduling of the execution of the instruction entities 106 is constrained by multiple design assurance levels. Scheduler 116 can be configured to assign instruction entities 106 into execution groups 110 such that each execution group 110 only contains instruction entities 106 having the same design assurance level. Limiting execution groups 110 to having only instruction entities 106 of the same design assurance level ensures that instruction entities 106 that have lower design assurance levels will not execute in parallel and interfere with the instruction entities 106 having higher design assurance levels. Although scheduling restrictions have been explained using design assurance levels, the scheduling restrictions can be any restriction that prevents instruction entities 106 from being in the same execution group 110.

In at least one exemplary embodiment, the scheduling of instruction entities 106 is affected by different application-specific factors or constraints (also referred to here as "constraining factors"). One example of a constraining factor arises when scheduler 116 schedules the execution of instruction entities 106 using a rate monotonic scheduling algorithm. When scheduler 116 schedules instruction entities 106 using a rate monotonic scheduling algorithm, each instruction entity 106 has an associated rate that indicates the frequency of execution repetition. Scheduler 116 uses these associated rates to schedule instruction entities 106 onto a continuous execution timeline. Further, the rates associated with an instruction entity 106 also dictate an execution deadline within the execution timeline. For example, an instruction entity 106 with a faster rate will have more frequent deadlines than an instruction entity 106 with a slower rate. Due to the different deadlines in a rate monotonic system, the master instruction entities 105 have a faster or the same rate of execution than the slave instruction entities 107 so that the processing budget allotted to the master instruction entities 105 allows the slave instruction entities 107 in the execution group 110 to complete execution within a single period of the master instruction entities 105. In contrast, if the master instruction entities 105 have a slower rate than the slave instruction entities 107, the deadlines for the slave instruction entities 107 would expire before the expiration of the deadline for the master instruction entities 105. To implement this scheduling constraint, in one implementation, scheduler 116 requires instruction entities 106 within an execution group 110 to have the same rate of execution. Alternatively, scheduler 116 can assign the instruction entities 106 to execution groups so that the one or more master instruction entities 105 of each execution group 110 have an execution rate that is greater than or equal to the execution rates of the slave instruction entities 107 within that execution group 110. The enforcement of rate constraints in this manner ensures that the slave instruction entities 107 assigned to execute on the slave processing units 108 will complete execution within a single period of the master instruction entities 105.

In at least one exemplary implementation of this embodiment in a time partitioned operating system, when a slave instruction entity 107 requires use of the full processing budget allotted to the execution of master instruction entities 105 in its execution group 110, the scheduler 116 ensures that the slave instruction entity 107 has the opportunity to execute during the full allotted time by preventing the master instruction entities 105 from finishing execution before the entire allotted budget is consumed. For example, the scheduler 116 allots a processing budget to a master instruction entity 105 for execution on master processing unit 108. The scheduler 116 schedules the execution of slave instruction entities 107 on the slave processing units 108 while the execution of master instruction entities 105 consumes the processing budget. When slave instruction entities 107 require the full processing budget allotted to the master instruction entities 105 to complete execution, the scheduler 116 prevents the execution of master instruction entities 105 from finishing before the allotted processing budget is fully exhausted.

In an alternative exemplary embodiment, scheduler 116 schedules the execution of instruction entities 106 belonging to execution groups 110 in a non-time partitioned operating system. As discussed above, the scheduler 116 schedules slave instruction entities 107 to execute during the execution of master entities 105 belonging to the same execution group 110. In at least one implementation, when the scheduler 116 schedules a slave instruction entity 107 associated with an execution group 110, the scheduler 116 will not schedule the execution of a master instruction entity 105 belonging to a different execution group 110 until the slave instruction entity 107 finishes executing. In a further embodiment, the scheduler 116 defines a maximum time extension for the execution of instruction entities 106. The maximum time extension defines a period of time allotted for execution of the master instruction entity 105 to provide more time for the execution of the instruction entities 106 within the execution group 110. When the maximum time extension is reached, scheduler 116 terminates the execution of the instruction entities 106 in the execution group 110. The use of a maximum time extension prevents run-away instruction entities 106 from preventing scheduler 116 from scheduling the execution of other instruction entities 106 that belong to other execution groups 110.

Scheduler 116 enforces the scheduling requirements when assigning instruction entities 106 into different execution groups 110 for execution on processing cluster 102. By enforcing schedule-before relationships, scheduling restrictions like design-assurance levels, and scheduling constraints like required execution time and rate scheduling, while using execution groups 110, real-time safety-critical systems can be executed on multiple processing units 108 while bounding the worst case execution time of instruction entities 106.

Figure 2:
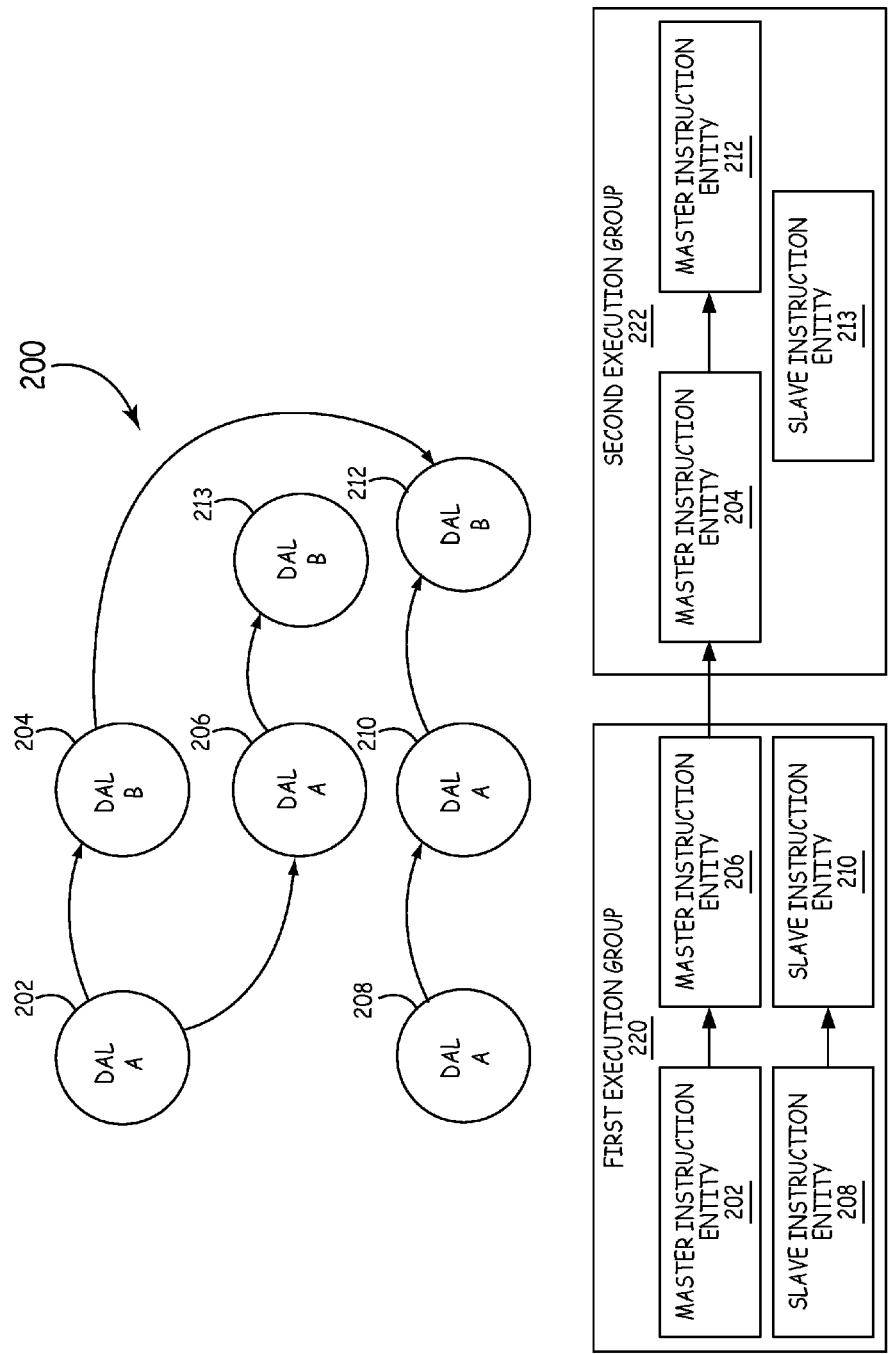
FIG. 2 is a block diagram illustrating the enforcement of scheduling restrictions and schedule before relationships when assigning instruction entities to execution groups in one usage example.

FIGS. 2-5 illustrate various examples of enforcing schedule-before relationships, scheduling restrictions, and constraints when assigning instruction entities to execution groups in various exemplary usage scenarios. For example, FIG. 2 illustrates one example of enforcing design assurance levels (A and B) and schedule-before relationships 200 when assigning instruction entities 202, 204, 206, 208, 210, and 212 into execution groups 220 and 222 in one example usage scenario.

In the example shown in FIG. 2, there are six different schedule-before relationships 200 that exist among the instruction entities shown. A first schedule-before relationship 200 requires that the execution of instruction entity 202 completes before the execution of instruction entity 204 begins. A second schedule-before relationships 200 requires that the execution of instruction entity 202 completes before the execution of instruction entity 206 begins. A third schedule-before relationships 200 requires that the execution of instruction entity 208 completes before the execution of instruction entity 210 begins. A fourth schedule-before relationships 200 requires that the execution of instruction entity 210 completes before the execution of instruction entity 212 begins. A fifth schedule-before relationships 200 requires that the execution of instruction entity 204 complete before the execution of instruction entity 212 begins. A sixth schedule-before relationships 200 requires that the execution of instruction entity 206 complete before the execution of instruction entity 213 begins. Also, instruction entities 202, 204, 206, 208, 210, 212, and 213 are subject to different scheduling restrictions. In the example shown in FIG. 2, the instruction entities 202, 204, 206, 208, 210, 212, and 213 have different design assurance levels. Instruction entities 202, 206, 208, and 210 have a design assurance level of "A", while instruction entities 204, 212, and 213 have a design assurance level of "B".

In this example, scheduler 116 of FIG. 1 schedules the execution of instruction entities 202, 204, 206, 208, 210, 212, and 213 so as to preserve the schedule-before relationships 200. In this example, scheduler 116 also schedules the execution of instruction entities 202, 204, 206, 208, 210, 212, and 213 so that instruction entities 106 within each execution group 110 all have the same design assurance level. That is, in this example, scheduler 116 assigns instruction entities 202, 204, 206, 208, 210, 212, and 213 into two different execution groups 220 and 222 in order to satisfy the schedule-before relationships 200 and design assurance level scheduling restrictions.

To satisfy the first schedule-before relationship 200, where the execution of instruction entity 202 must finish before the execution of instruction entity 204 begins, scheduler 116 schedules instruction entity 202 to complete execution before instruction entity 204 begins executing. Further, scheduler 116 identifies the design assurance level of instruction entity 202 and instruction entity 204. Because instruction entity 202 executes before instruction entity 204 and instruction entity 202 has a design assurance level of "A" and instruction entity 204 has a design assurance level of "B", scheduler 116 assigns instruction entities 202 and 204 to different execution groups. For example, scheduler 116 assigns instruction entity 202 as a master instruction entity 202 in a first execution group 220 and instruction entity 204 as a master instruction entity 204 in a second execution group 222. The second execution group 222, contains master instruction entity 204, which executes after master instruction entity 202 in the first execution group 220 to preserve the schedule-before relationship 200 that exists between instruction entity 202 and instruction entity 204. Further, because scheduler 116 assigns instruction entity 202 and instruction entity 204 to different execution groups, scheduler 116 prevents instruction entity 202 having an "A" design assurance level and instruction entity 204 having a "B" design assurance level from being in the same execution group. Being in different execution groups, instruction entity 202 and instruction entity 204 do not interfere with each other through shared hardware such as caches (beyond initial cache state) and memory controllers.

To satisfy the second schedule-before relationship 200, where instruction entity 202 must finish executing before the execution of instruction entity 206 begins, scheduler 116 schedules the execution of instruction entity 202 to complete before the execution of instruction entity 206 begins. Further, scheduler 116 identifies that the design assurance level of instruction entity 202 and instruction entity 206 are identical. Because instruction entity 202 and instruction entity 206 have the same design assurance level, scheduler 116 assigns instruction entities 202 and 206 to the same execution group. In this example, scheduler 116 assigns instruction entity 206 as a second master instruction entity 206 of the first execution group 220, which includes instruction entity 202 as described above. Scheduler 116 satisfies the second schedule-before relationship 200 by allotting a processing budget to the execution of master instruction entity 202 and then, when the execution of master instruction entity 202 exhausts its respective allotted budget; scheduler 116 allots a processing budget to master instruction entity 206.

To satisfy the third schedule-before relationships 200, where the execution of instruction entity 208 completes before the execution of instruction entity 210 begins, scheduler 116 schedules the execution of instruction entity 208 to complete before the execution of instruction entity 210 begins. Also, the execution of instruction entity 208 and instruction entity 210 is not dependent on the execution of instruction entities 202, 204, and 206. Further, scheduler 116 identifies that the design assurance level of instruction entity 208 and instruction entity 210 are identical. Because the design assurance level of instruction entity 208 is the same as the design assurance level of instruction entity 210, scheduler 116 assigns instruction entity 208 and instruction entity 210 to the same execution group.

In certain embodiments, scheduler 116 schedules instruction entities 106 to utilize multiple processing units 108 within a processing cluster 102 by assigning instruction entities 106 as slave instruction entities 107 in execution groups 110. Because instruction entity 208 has no data dependencies upon other instruction entities, in certain exemplary implementations, instruction entity 208 is assigned to the earliest executing execution group that has the same design assurance level as slave instruction entity 208. In the shown example, instruction entity 208 can execute as a slave instruction entity 208 in the first execution group 220 because instruction entity 208 has the same design assurance level as both master instruction entity 202 and master instruction entity 206 in the first execution group. For the above reasons, instruction entity 208 is assigned as a slave instruction entity 208 in the first execution group 220.

In at least one exemplary embodiment, scheduler 116 also schedules instruction entity 210 as a slave instruction entity 210. Because instruction entity 208 is in first execution group 220 and slave instruction entity 210 has the same design assurance level as slave instruction entity 208, instruction entity 210 is assigned to the first execution group 220. To satisfy the third schedule-before relationship 200, where the execution of instruction entity 208 must finish executing before the execution of instruction entity 210 begins, scheduler 116 schedules the execution of slave instruction entity 208 before the execution of slave instruction entity 210. Further, as slave instruction entity 208 and slave instruction entity 210 are slave instruction entities 107 in execution group 220, scheduler 116 only schedules the execution of slave instruction entities 208 and 210 during the execution of master instruction entities 202 and 206.

To satisfy the fourth schedule-before relationship 200, where the execution of instruction entity 210 must finish executing before the execution of instruction entity 212 begins, scheduler 116 schedules the execution of instruction entity 210 to complete before the execution of instruction entity 212 begins. Further, scheduler 116 identifies the design assurance levels of instruction entity 210 and instruction entity 212. Because instruction entity 210 has a different design assurance level than instruction entity 212, instruction entity 212 is assigned to a different execution group 110 than the first execution group 220 containing instruction entity 210. Because both instruction entity 204 and instruction entity 212 have a design assurance level of "B", instruction entity 204 and instruction entity 212 can be assigned to the same execution group. For these reasons, instruction entity 212 is assigned to the second execution group 222 as master instruction entity 212.

To satisfy the fifth schedule-before relationship 200, where the execution of instruction entity 204 must finish executing before the execution of instruction entity 212 begins, and where instruction entity 204 and instruction entity 212 are both master instruction entities in the second execution group 222, scheduler 116 allots processing budgets to instruction entity 204 and 212 such that instruction entity 204 completes execution before the execution of instruction entity 212 begins. For example, scheduler 116 allots a processing budget to master instruction entity 204. When the execution of master instruction entity 204 exhausts the allotted processing budget, master instruction entity 212 becomes schedulable by scheduler 116.

To satisfy the sixth schedule-before relationship 200, where the execution of instruction entity 206 must finish execution before the execution of instruction entity 213 begins, instruction entity 213 is assigned to the second execution group 222 as a slave instruction entity 213 because slave instruction entity 213 has the same design assurance level as master instruction entities 204 and 212. Because slave instruction entity 213 only executes when master instruction entities 204 and 212 are executing, the sixth schedule-before relationship 200 is satisfied because master instruction entities 204 and 212 only execute after master instruction entity 206 completes execution due to the first and fifth schedule-before relationships 200.

In certain exemplary embodiments, as discussed above, instruction entities 106 are assigned to different execution groups based on schedule-before relationships involving the different instruction entities 106 and design assurance levels of the instruction entities 106. Further, scheduler 116 assigns instruction entities 106 to a timeline based on the schedule-before relationships of the instruction entities within the separate execution groups. For example, as discussed above, instruction entity 202, 204, 206, 208, 210, and 212 are divided into two different execution groups. First execution group 220 contains instruction entities 202, 206, 208, and 210 because instruction entities 202, 206, 208, and 210 have the same design assurance level. Second execution group 222 contains instruction entities 204 and 212 because instruction entities 204 and 212 have a design assurance level that is different from the design assurance level of the instruction entities 202, 206, 208, and 210 in the first execution group 220. To control the schedule-before relationships, scheduler 116 allots a processing budget to the master instruction entities 202, 206, 204, and 212 within each execution group and schedules the instruction entities 202, 204, 206, 208, 210, and 212 within the execution groups 220 and 222 to execute in an order that preserves the schedule-before relationships 200.

Figure 3:
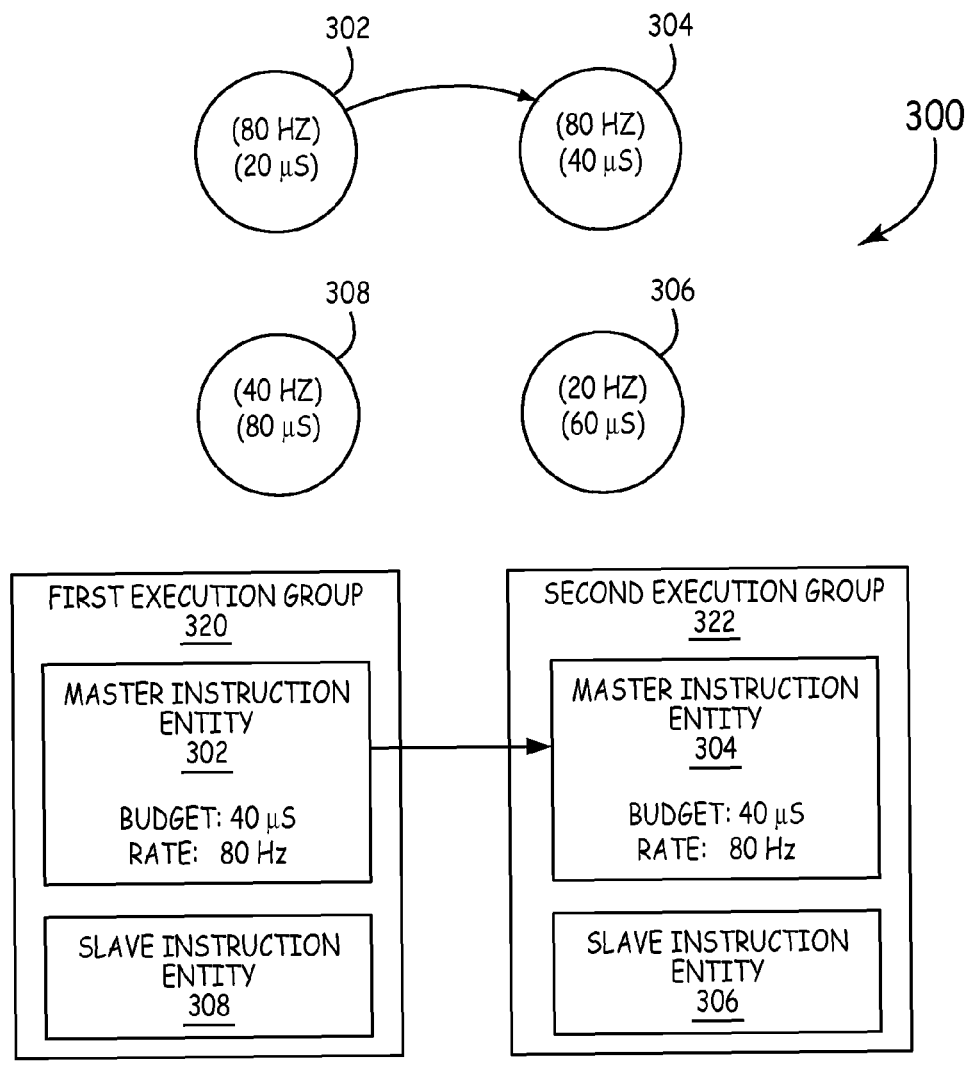
FIG. 3 is a block diagram illustrating the enforcement of schedule before relationships, rate constraints, and execution time constraints when assigning instruction entities to execution groups in one usage example.
Figure 4:
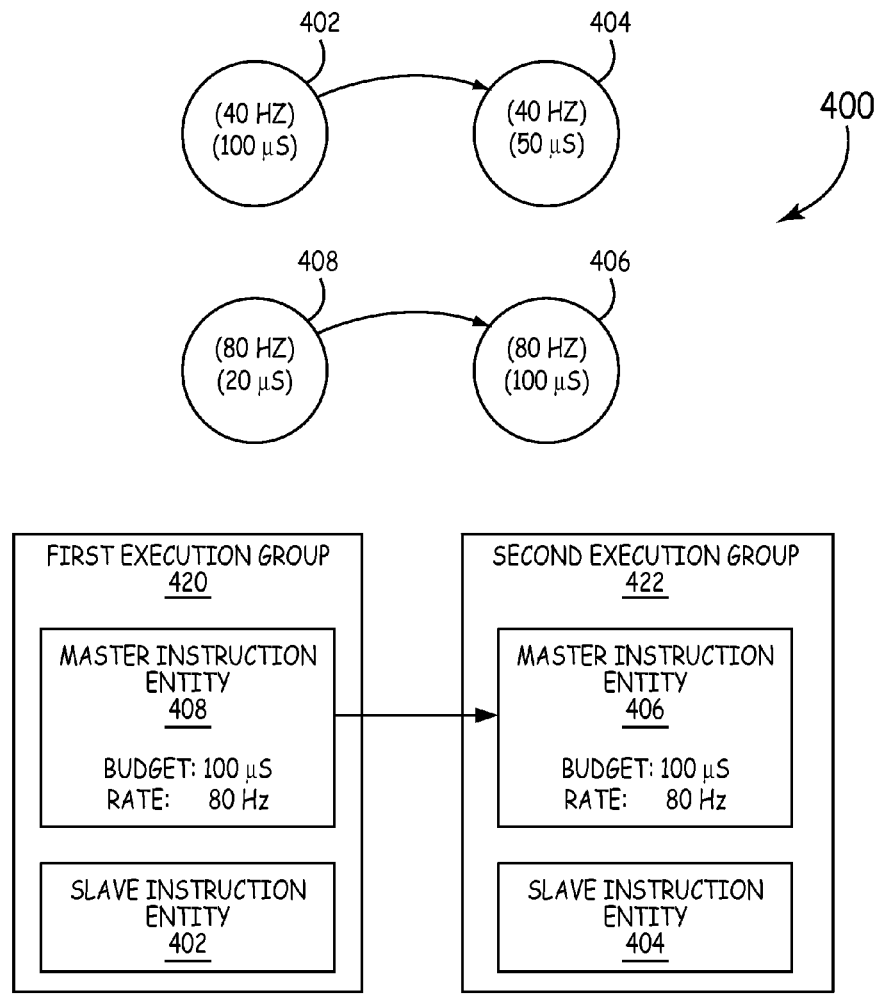
FIG. 4 is a block diagram illustrating the enforcement of schedule before relationships, rate constraints, and execution time constraints when assigning instruction entities to execution groups in one usage example.

Further examples, illustrated in FIGS. 3-4 show instruction entities where the design assurance level is the same for all instruction entities.

FIG. 3 illustrates one example of enforcing schedule-before relationships 300, rate constraints, and execution time constraints when assigning instruction entities 302, 304, 306, and 308 to execution groups 320 and 322 in one example usage scenario. In the example shown in FIG. 3, there is only one schedule-before relationship in schedule-before relationships 300 that exists among the instruction entities shown. This first schedule-before relationship 300 requires that the execution of instruction entity 302 completes before the execution of instruction entity 304 begins. Further, the execution of both instruction entities 308 and 306 is not dependent on the execution of other instruction entities 106.

To satisfy the first schedule-before relationship 300, where the execution of instruction entity 302 must finish before the execution of instruction entity 304 begins, scheduler 116 in FIG. 1 schedules the execution of instruction entity 302 to complete before the execution of instruction entity 304 begins. In some implementations, instruction entities in a schedule-before relationship 200 are assigned to different execution groups. In the particular example shown in FIG. 3, instruction entity 302 is assigned as a master instruction entity 302 in first execution group 320 and instruction entity 304 is assigned as master instruction entity 304 in second execution group 322. To preserve the schedule-before relationship, scheduler 116 allots a processing budget to master instruction entity 302, when the execution of master instruction entity 302 exhausts the allotted processing budget, the scheduler 116 allots a processing budget to master instruction entity 304. During the execution of master instruction entity 302, the scheduler can further schedule the execution of slave instruction entities in the first execution group 320. During the execution of master instruction entity 304, the scheduler can also schedule the execution of slave instruction entities in the second execution group 322.

In at least one exemplary embodiment, to increase parallelism among the instruction entities executed by the multiple processing units 108 in FIG. 1, scheduler 116 assigns instruction entities that are not part of a schedule-before relationship to execution groups 110. Further, scheduler 116 assigns the instruction entities that are not part of schedule-before relationships as slave instruction entities 107. In this example, instruction entities 306 and 308 are not involved in schedule-before relationships. Because instruction entities 306 and 308 are not involved in schedule-before relationships, scheduler 116 assigns instruction entities 308 and 306 as slave instruction entities within first execution group 320 and second execution group 322, respectively.

In a further exemplary embodiment, scheduler 116 assigns instruction entities to execution groups based on the rate of execution for the master instruction entity. As described above the execution rates associated with an instruction entity dictate execution deadlines within an execution timeline. Further, the execution rates of the instruction entities constrain the assigning of instruction entities to execution groups. For example, in a rate monotonic system, a master instruction entity 105 within an execution group 110 must have a faster or equal execution rate than slave instruction entities 107 within the execution group 110 to ensure that the instruction entities 106 in the execution group 110 complete execution before their respective execution deadlines. Further, in certain implementations, the execution rates of the slave instruction entities 107 within an execution group 110 have an execution rate that is harmonically proportional to the execution rates of the master instruction entities 105.

In the example shown in FIG. 3, master instruction entities 302 and 304 have execution rates of 80 Hz, slave instruction entity 306 has an execution rate of 40 Hz, and slave instruction entity 308 has an execution rate of 20 Hz. Because master instruction entity 302 has an execution rate that is faster than or equal to the execution rates of instruction entities 306 and 308, either or both of slave instruction entities 306 and 308 can be assigned as slave instruction entities in first execution group 320 or second execution group 322. As shown in FIG. 3, instruction entity 308 is assigned as slave instruction entity 308 in first execution group 320 and instruction entity 306 is assigned as slave instruction entity 306 in second execution group 322.

Further, as described above, in some implementations, the scheduler 116 allots a processing budget to the master instruction entity that provides substantial time for the instruction entities in the execution group to complete execution before their execution deadline. In the current example shown in FIG. 3, the first execution group 320 has master instruction entity 302 and slave instruction entity 308. Master instruction entity 302 requires 20 μs of execution time to complete execution before its execution deadline and slave instruction entity 308 requires 80 μs of execution time to complete execution. In some embodiments, because slave instruction entity 308 requires more execution time to complete execution, scheduler 116 allots a processing budget to master instruction entity 302 that would allow slave instruction entity 308 to complete execution before the execution deadline of slave instruction entity 308. For example, scheduler 116 adjusts the processing budget allotted to master instruction entity 302 to 40 μs to accommodate the execution of slave instruction entity 308. By executing for 40 μs at a rate of 80 Hz, both master instruction entity 302 and slave instruction entity 308 will have enough time available to complete execution. Similarly, in second execution group 322, master instruction entity 304 requires 40 μs to complete execution at a rate of 80 Hz and the slave instruction entity 306 requires 60 μs to complete execution at a rate of 20 Hz. Because the processing budget of 40 μs at a rate of 80 Hz is sufficient for the instruction entities 304 and 306 to complete execution, scheduler 116 allots the budget of 40 μs that is required to master instruction entity 304.

As described and illustrated in FIG. 3, scheduler 116 assigns instruction entities to execution groups based on schedule-before relationships and rate constraints. Further, scheduler 116 allots processing budgets to master instruction entities 105 based on the amount of execution time needed by instruction entities 106 in an execution group 110 to complete execution on processing cluster 102 by their respective execution deadlines. In this example, instruction entities 302 and 308 are assigned to a first execution group 320, where the scheduler 116 allots a processing budget of 40 μs to the execution of instruction entity 302. Also, scheduler 116 assigned instruction entities 304 and 306 to a second execution group 322. To enforce schedule-before relationships 300, scheduler 116 allots a processing budget for the execution of master instruction entity 302 in execution group 320. When the execution of master instruction entity 302 consumes the allotted processing budget, the scheduler allots a processing budget to master instruction entity 304 in the second execution group 322.

FIG. 4 illustrates one example of enforcing schedule-before relationships 400, rate constraints, and execution time constraints when assigning instruction entities 402, 404, 406, and 408 to execution groups 420 and 422 in one example usage scenario. In the example shown in FIG. 4, there are two schedule-before relationships in schedule-before relationships 400. A first schedule-before relationship 400 requires that the execution of instruction entity 402 completes before the execution of instruction entity 404 begins. A second schedule-before relationship 400 requires that the execution of instruction entity 408 completes before the execution of instruction entity 406 begins. Further, the execution of instruction entities 402 and 404 in the first schedule-before relationship 400 is independent of the execution of instruction entities 406 and 408 in the second schedule-before relationship 400.

To satisfy the first schedule-before relationship 400, where the execution of instruction entity 402 must finish before the execution of instruction entity 404 begins, instruction entity 402 and instruction entity 404 are assigned to execution groups in such a way that when scheduler 116 enforces a schedule-before relationship that exists between different master instruction entities 105, the first schedule-before relationship 400 is either implicitly or impliedly satisfied. For example, in some implementations, scheduler 116 explicitly enforces a schedule-before relationship between two instruction entities that are also master instruction entities 105 in different execution groups 110. Because the instruction entities 402 and 404 are slave instruction entities 107 in the different execution groups 110 containing the master instruction entities 105 involved in the schedule-before relationship, instruction entities 402 and 404 are only able to execute during the execution of their respective master instruction entities 105. Due to this explicit schedule-before relationship that exists between the master instruction entities 105, instruction entities 402 and 404 impliedly receive the schedule-before relationship that exists between the master instruction entities 105. Further, scheduler 116 allots processing budgets to the master instruction entities 105 such that the slave instruction entities 402 and 404 have enough time to complete execution within a single execution period of the master instruction entities 105. Also, both instruction entity 402 and instruction entity 404 have an execution rate of 40 Hz.

To satisfy the second schedule-before relationship 400, where the execution of instruction entity 408 must finish before the execution of instruction entity 406 begins, scheduler 116 allots processing budgets to instruction entity 408 and instruction entity 406 to ensure that instruction entity 408 completes execution before the execution of instruction entity 406 begins. The explicit enforcement of the second schedule-before relationship 400 by scheduler 116 also impliedly enforces the first schedule-before relationship 400 as described above. Further both instruction entity 408 and instruction entity 406 have a rate of execution of 80 Hz.

In the particular example illustrated in FIG. 4, the two schedule-before relationships 400 involving instruction entities 402, 404, 406, and 408 are assigned to a first execution group 420 and a second execution group 422. Alternatively, when all the instruction entities have the same design assurance level, all the instruction entities can also be assigned to a single execution group as illustrated in FIG. 2. In the present example, where the instruction entities 402, 404, 406, and 408 are assigned to different execution groups 420 and 422, the master instruction entity of each execution group 420 and 422 has an execution rate that is faster than or equal to the execution rate of the slave instruction entity. In an alternative implementation, an execution group 110 can have multiple master instruction entities 105 and multiple slave instruction entities 107, where one or more master instruction entities 105 have execution rates that are slower than the execution rates of the slave instruction entities 107 as long as the scheduler 116 allots a processing budget for the execution of the multiple master instruction entities 105 that provides enough execution time to address the budgetary needs for the execution of the multiple slave instruction entities 107. Because instruction entities 406 and 408, involved in the second schedule-before relationship 400, have a faster execution rate than instruction entities 402 and 404, instruction entities 408 and 406 are assigned to be the master instruction entities in execution groups 420 and 422, respectively.

Further, as described above, the scheduler 116 allots a processing budget to the master instruction entity that allows the execution of the slave instruction entities 107 to complete execution within a single execution period of the master instruction entities 105. In the current example shown in FIG. 4, the first execution group 420 contains master instruction entity 408 and slave instruction entity 402. Master instruction entity 408 requires 20 μs of execution time at an execution rate of 80 HZ to complete execution and slave instruction entity 402 requires 100 μs of execution time at an execution rate of 40 Hz to complete execution. To allow both master instruction entity 408 and slave instruction entity 402 to finish executing and satisfy any implied schedule-before relationships 400 involving slave instruction entities 107, the master instruction entity 408 is allotted a processing budget that allows slave instruction entity 402 to finish executing within one execution period of master instruction entity 408. For example, scheduler 116 allots a processing budget of 100 μs to master instruction entity 408. Further, scheduler allots a processing budget of 100 μs for the execution of master instruction entity 406 at an execution rate of 80 Hz, which allows slave instruction entity 404 to finish execution within one execution period of master instruction entity 406. In one embodiment, the scheduler 116 dynamically determines the processing budgets allotted to the master instruction entities. Alternatively, the processing budgets allotted to the master instruction entities is defined in a static definition of the execution groups.

In an alternative embodiment, instruction entities 402, 404, 406, and 408 are all assigned to the same execution group. When instruction entities 402, 404, 406, and 408 are within the same execution group, the instruction entities 408 and 406 are assigned to be master instruction entities because their execution rate of 80 Hz is faster than the execution rates of slave instruction entities 402 and 404, which are 40 HZ. Due to the slower execution rates, instruction entities 402 and 404 are assigned to be slave instruction entities 402 and 404. When the processing budgets are allotted to the master instruction entities 408 and 406, allotting a processing budget of 20 μs to master instruction entity 408 at an execution rate of 80 Hz and a processing budget of 100 μs to master instruction entity 406 at an execution rate of 80 Hz provides 240 μs of execution time at an execution rate of 40 Hz. As the processing budgets required by the master instruction entities 408 and 406 provide enough execution time for the slave instruction entity 402 and 404 to complete execution within one period of the master instruction entities 406 and 408, the combined processing budget of 240 μs allotted to master instruction entities 408 and 406 is sufficient to provide enough execution time to the slave instruction entities 402 and 404 to complete execution before their respective execution deadline.

As described above and illustrated in FIG. 4, scheduler 116 assigns instruction entities to execution groups based on schedule-before relationships and rate constraints. Further, scheduler 116 allots processing budgets to master instruction entities that provide sufficient execution time to the instruction entities in an execution group to complete execution on processing cluster 102.

Figure 5:
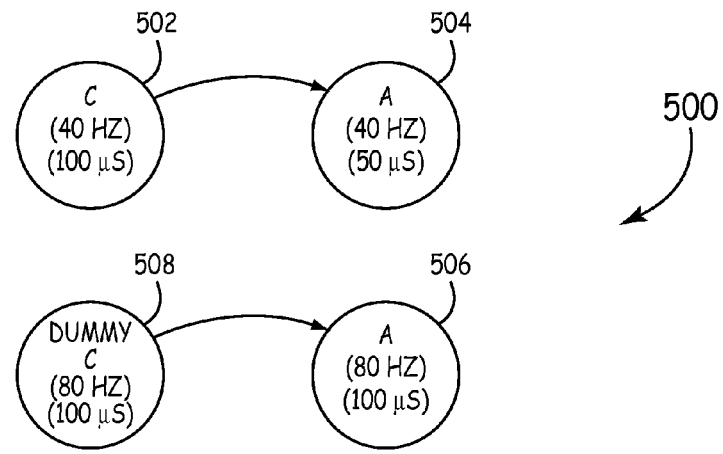
FIG. 5 is a block diagram illustrating the enforcement of scheduling restrictions, schedule before relationships, rate constraints, and execution time constraints when assigning instruction entities to execution groups in one usage example.
Figure 5:
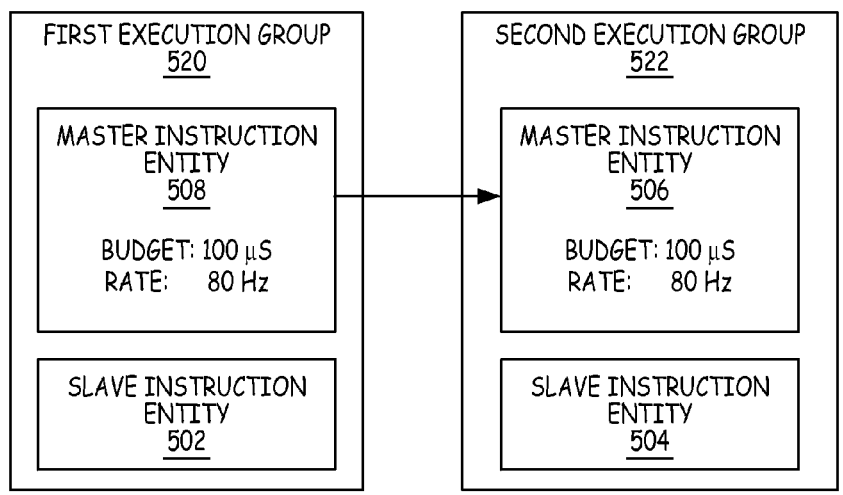

FIG. 5 illustrates one example of enforcing schedule-before relationships 500, scheduling restrictions, rate constraints, and execution time constraints when assigning instruction entities 502, 504, 506 and 508 to execution groups 520 and 522 in one example usage scenario. In the example shown in FIG. 5, there are two schedule-before relationships in schedule-before relationships 500. A first schedule-before relationship 500 requires that the execution of instruction entity 502 completes before the execution of instruction entity 504 begins. A second schedule-before relationship 500 requires that the execution of instruction 408 completes before the execution of instruction entity 406 begins.

In certain exemplary implementations, rate and design assurance level constraints prevent scheduler 116 from assigning an instruction entity as a master instruction entity. For example, as illustrated in FIG. 5, the first schedule-before relationship 500 includes instruction entity 502 and instruction entity 504. Instruction entity 502 has a design assurance level of "C" while instruction entity 504 has a design assurance level of "A". Due to scheduling restrictions, instruction entities of different design assurance levels can not be in the same execution group. As instruction entity 502 has a different design assurance level than instruction entity 504, instruction entity 502 is assigned to a first execution group 520 and instruction entity 504 is assigned to a second execution group 522. Further, in the second schedule-before relationship instruction entity 506 has a design assurance level that is identical to the design assurance level of instruction entity 504 in execution group 522. Because instruction entity 506 has the same design assurance level as instruction entity 504, instruction entity 506 is also assigned to second execution group 522.

In the example shown in FIG. 5, instruction entity 506 has a faster execution rate than instruction entity 504. Because of the faster rate of execution, instruction entity 504 is assigned to be a slave instruction entity 504 and instruction entity 506 is assigned to be a master instruction entity 506. However, in certain implementations, there will be no instruction entity having a particular design assurance level with an execution rate fast enough to become the master instruction entity 105 in the execution group 520 of slave instruction entity 502 and ensure that slave instruction entity 502 executes before slave instruction entity 504. In this case a dummy instruction entity 508 is created. A dummy instruction entity is an instruction entity that idles and consumes execution time, but does not perform any task. To create a dummy instruction entity 508 that satisfies the scheduling restrictions and the rate constraints, scheduler 116 creates a dummy instruction entity 508 that has a design assurance level that is the same as the slave instruction entities in its respective execution group 110. For example, as slave instruction entity 502 has a design assurance level of "C", dummy instruction entity 508 has a design assurance level of "C". Further, in some implementations, scheduler 116 creates a schedule-before relationship with the master instruction entity 105 of another execution group 110. In this example, scheduler 116 creates the second schedule-before relationship 500, where the execution of dummy instruction entity 508 completes before the execution of master instruction entity 506 begins. Further, scheduler 116 assigns an execution rate to the dummy instruction entity 508 that is the same as the execution rate of the master instruction entity in the schedule-before relationship. In the present example, scheduler 116 assigns dummy instruction entity 508 a rate of 100 Hz, which is the same as the execution rate for master instruction entity 506. The creation of the dummy instruction entities provides more flexibility to scheduler 116 when enforcing schedule-before relationships, rate constraints, and scheduling restrictions. While the execution of dummy instruction entity 508 consumes processing resourced by idling one or more processing units 108, the scheduling of dummy instruction entity 508 enables the parallel execution of instruction entities 504, and 506.

Figure 6:
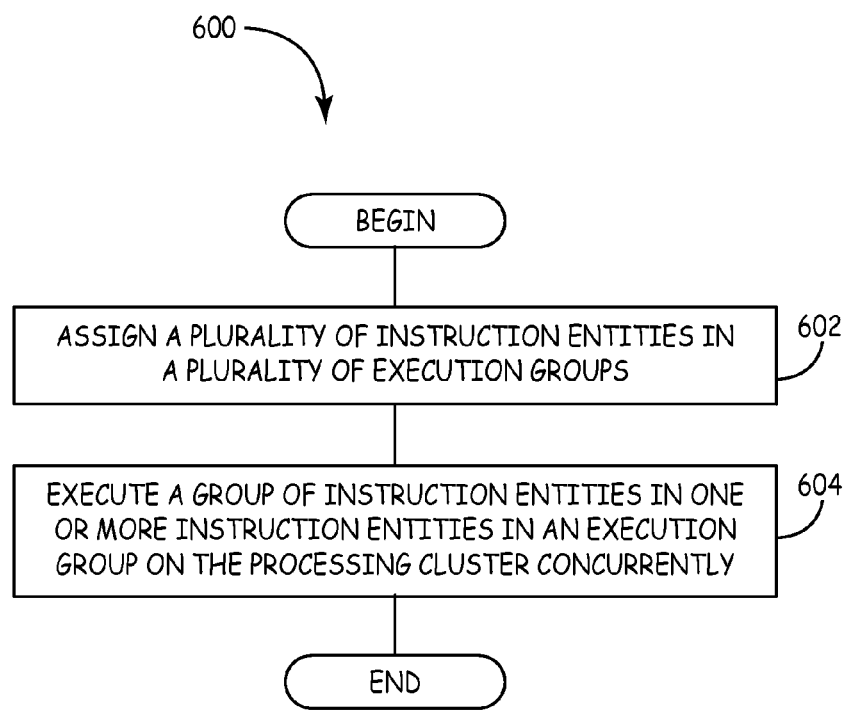
FIG. 6 is flow diagram of one exemplary embodiment of a method of executing instruction entities on a processing cluster.

FIG. 6 is a flow diagram of one exemplary embodiment of a method 600 of executing instruction entities 106 on a processing cluster 102. The embodiment of method 200 shown in FIG. 6 is described here as being implemented in the system 100 of FIG. 1 though other embodiments can be implemented in other ways.

Method 600 comprises executing a plurality of instruction entities in a plurality of execution groups (block 602). Each execution group contains one or more instruction entities where the plurality of instruction entities are divided into master instruction entities and slave instruction entities. The master instruction entities execute on a master processing unit 108 and the slave instruction entities execute on slave processing units 108. Further, the plurality of execution groups are configured to aid in the enforcement of schedule-before relationships and scheduling restrictions. For example, in certain implementations, a first instruction entity 106 has a schedule-before relationship with a second instruction entity 106 where the first and second instruction entities 106 have different design assurance levels. To enforce the schedule-before relationship and the scheduling restrictions, a scheduler 116 places instruction entity 106 in a first execution group 110 that has a master instruction entity 105 that executes before the master instruction entity 105 of a second execution group 110 containing the second instruction entity 106.

Method 600 further comprises assigning a group of instruction entities in one or more instruction entities in an execution group on the processing cluster concurrently (block 604). Scheduler 116 allots a processing budget to the master instruction entities 105 within an execution group. During the execution of the master instruction entities 105, scheduler 116 schedules the execution of the slave instruction entities 107.

The methods and techniques described here may be implemented in digital electronic circuitry, or with a programmable processor (for example, a special-purpose processor or a general-purpose processor such as a computer), firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present disclosure. Therefore, it is manifestly intended that this disclosure be limited only by the claims and the equivalents thereof.

What is claimed is:

1. A system for grouping instruction entities, the system comprising:
    a processing cluster to execute software, the processing cluster comprising a plurality of processing units;
    wherein the processing cluster is configured to execute the software as a plurality of instruction entities in a time partitioned execution environment, wherein processing budgets are allotted to specify execution time available during each time period in which an instruction entity in the plurality of instruction entities can execute;
    wherein the processing cluster is further configured to execute the plurality of instruction entities in a plurality of execution groups, each execution group comprising one or more instruction entities;
    wherein the processing cluster executes a group of instruction entities in the one or more instruction entities as an execution group, wherein instruction entities that execute concurrently on the processing cluster are constrained to belong to a same execution group, wherein the execution group comprises a first set of instruction entities executing on a first processing unit in the processing cluster, wherein the group of instruction entities in the execution group are constrained to execute within a processing budget allotted to the first set of instruction entities and instruction entities that are not part of the execution group are prevented from executing on the processing cluster during the execution of the first set of instruction entities, wherein, when the execution group comprises instruction entities other than the first set of instruction entities, the instruction entities other than the first set of instruction entities in the execution group execute on a processing unit in the processing cluster other than the first processing unit the; and
    wherein the execution groups are configured so that a plurality of schedule-before relationships are established, each schedule-before relationship being established between different instruction entities by ordering the execution of instruction entities within the plurality of execution groups and ordering the execution of instruction entities in different execution groups in the plurality of execution groups.

2. The system of claim 1, wherein the plurality of processing units comprises a master processing unit and at least one slave processing unit.

3. The system of claim 2, wherein at least one master instruction entity in the one or more instruction entities executes on the master processing unit and the balance of the one or more instruction entities are slave instruction entities that execute on the at least one slave processing unit.

4. The system of claim 3, wherein the first set of instruction entities is the at least one master instruction entity.

5. The system of claim 4, wherein the at least one master instruction entity is allotted a processing budget for executing on the master processing unit that ensures that the one or more instruction entities in the execution group finish execution before their respective execution deadlines.

6. The system of claim 1, wherein a schedule-before relationship between two instruction entities in the plurality of schedule-before relationships is enforced through another schedule-before relationship between other instruction entities in the plurality of schedule-before relationships.

7. The system of claim 1, wherein the processing cluster comprises a multi-core processor, and wherein the plurality of processing units comprises multiple processor cores.

8. The system of claim 1, wherein the plurality of instruction entities in the plurality of execution groups are scheduled to execute on the processing cluster according to a rate monotonic scheduling algorithm.

9. The system of claim 8, wherein instruction entities in the different instruction entities in a schedule before relationship have a same scheduling rate.

10. The system of claim 9, wherein the first set of instruction entities have a faster execution rate than other instruction entities in the execution group.

11. The system of claim 1, wherein the one or more instruction entities within the execution group satisfy a scheduling restriction.

12. The system of claim 1, further comprising at least one storage medium that stores a static definition of the allocation of the plurality of instruction entities into the plurality of execution groups.

13. A method for executing software on a processing cluster comprising a plurality of processing units in a time partitioned execution environment, wherein processing budgets are allotted to specify execution time available during each time period in which an instruction entity in the plurality of instruction entities can execute, the software comprising a plurality of instruction entities, the method comprising:
    assigning the plurality of instruction entities in a plurality of execution groups, each execution group comprising one or more instruction entities; and
    executing a group of instruction entities in the one or more instruction entities as an execution group on the processing cluster, wherein instruction entities that execute concurrently on the processing cluster are constrained to belong to a same execution group, wherein the execution group comprises a first set of instruction entities executing on a first processing unit in the processing cluster, wherein the group of instruction entities in the execution group are constrained to execute within a processing budget allotted to the first set of instruction entities and instruction entities that are not part of the execution group are prevented from executing on the processing cluster during the execution of the first set of instruction entities, wherein, when the execution group comprises instruction entities other than the first set of instruction entities, the instruction entities other than the first set of instruction entities in the execution group execute on a processing unit in the processing cluster other than the first processing unit the; and wherein the execution groups are configured so that a plurality of schedule-before relationships are established, each schedule-before relationship being established between different instruction entities by ordering the execution of instruction entities within the plurality of execution groups and ordering the execution of instruction entities in different execution groups in the plurality of execution groups.

14. The method of claim 13, wherein the plurality of processing units comprises a master processing unit and at least one slave processing unit, wherein at least one master instruction entity in the one or more instruction entities in the execution group executes on the master processing unit and the balance of the one or more instruction entities are slave instruction entities that execute on the at least one slave processing unit.

15. The method of claim 14, wherein scheduling the execution groups further comprises scheduling the execution groups using rate monotonic scheduling.

16. The method of claim 15, wherein a master execution rate of the at least one master instruction entity is equal to or greater than slave execution rates of the slave instruction entities.

17. The method of claim 13, further comprising:
identifying scheduling restrictions for the plurality of instruction entities; and allocating the plurality of instruction entities to different execution groups based on the scheduling restrictions in conjunction with the schedule-before relationships.

18. The method of claim 13, further comprising allocating instruction entities in the one or more instruction entities without schedule-before relationships as slave instruction entities in the execution group.

19. A program product for executing a plurality of instruction entities on a processing cluster comprising a plurality of processing units, the program product comprising a plurality of instructions tangibly stored on a non-transitory storage medium, the instructions operable, when executed, to cause the processing cluster to:

execute the plurality of instruction entities in a plurality of execution groups, each execution group comprising one or more instruction entities, wherein the plurality of instruction entities are executed in a time portioned environment, wherein processing budgets are allotted to specify execution time available during each time period in which an instruction entity in the plurality instruction entities can execute; and execute a group of instruction entities in the one or more instruction entities as an execution group on the processing cluster, wherein instruction entities that execute concurrently on the processing cluster are constrained to belong to a same execution group, wherein the execution group comprises a first set of instruction entities executing on a first processing unit in the processing cluster, wherein the group of instruction entities in the execution group are constrained to execute within a processing budget allotted to the first set of instruction entities and instruction entities that are not part of the execution group are prevented from executing on the processing cluster during the execution of the first set of instruction entities, wherein, when the execution group comprises instruction entities other than the first set of instruction entities, the instruction entities other than the first set of instruction entities in the execution group execute on a processing unit in the processing cluster other than the first processing unit the; and wherein the execution groups are configured so that a plurality of schedule-before relationships are established, each schedule-before relationship being established between different instruction entities by ordering the execution of instruction entities within the plurality of execution groups and ordering the execution of instruction entities in different execution groups in the plurality of execution groups.

20. The program product of claim 19, wherein the plurality of instructions are further operable to cause the processing cluster to:
identify scheduling constraints for the plurality of instruction entities; and
allocate the plurality of instruction entities to different execution groups based on the scheduling constraints in conjunction with the schedule-before relationships.

* * * * *